(12) United States Patent
Jiang et al.

(10) Patent No.: US 11,500,691 B2
(45) Date of Patent: Nov. 15, 2022

(54) PREDICTIVE SCALING OF DATACENTERS

(71) Applicant: VMware, Inc., Palo Alto, CA (US)

(72) Inventors: Jianxiong Jiang, Palo Alto, CA (US);
Zhelong Pan, Palo Alto, CA (US);
Charan Singh, Palo Alto, CA (US);
Sabareesh Subramaniam, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 314 days.

(21) Appl. No.: 16/931,364

(22) Filed: Jul. 16, 2020

(65) Prior Publication Data
US 2022/0019482 A1 Jan. 20, 2022

(51) Int. Cl.
G06F 9/46 (2006.01)
G06F 9/50 (2006.01)
G06F 3/06 (2006.01)
G06F 11/30 (2006.01)
G06N 20/00 (2019.01)
G06F 9/455 (2018.01)

(52) U.S. Cl.
CPC .......... *G06F 9/5083* (2013.01); *G06F 3/0631* (2013.01); *G06F 9/5011* (2013.01); *G06F 11/3006* (2013.01); *G06N 20/00* (2019.01); *G06F 2009/45562* (2013.01); *G06F 2009/45591* (2013.01); *G06F 2209/508* (2013.01); *G06F 2209/5022* (2013.01)

(58) Field of Classification Search
CPC .. G06F 9/5083; G06F 9/5011; G06F 11/3006; G06F 2009/45562; G06F 2009/45591; G06F 2209/5022; G06F 2209/508
See application file for complete search history.

(56) References Cited

U.S. PATENT DOCUMENTS

| 8,095,929 | B1* | 1/2012 | Ji ........................ G06F 9/45558 718/1 |
| 9,923,785 | B1* | 3/2018 | Li ........................... H04L 41/40 |
| 10,579,403 | B2 | 3/2020 | Antony |
| 2016/0077859 | A1 | 3/2016 | Cropper |
| 2017/0090988 | A1 | 3/2017 | Young |
| 2017/0269967 | A1 | 9/2017 | Steffen |

(Continued)

FOREIGN PATENT DOCUMENTS

CN 107851106 A * 3/2018 .......... G06F 11/3442

*Primary Examiner* — Diem K Cao
(74) *Attorney, Agent, or Firm* — Clayton, McKay & Bailey, PC

(57) ABSTRACT

Examples described herein include systems and methods for efficiently scaling an SDDC. An example method can include storing resource utilization information for a variety of resources of the SDDC. The example method can also include predicting a future resource utilization rate for the resources and determining that a predicted utilization rate is outside of a desired range. The system can determine how long it would take to perform the scaling, including adding or removing a host and performing related functions such as load balancing or data transfers. The system can also determine how long the scaling is predicted to benefit the SDDC to ensure that the benefit is sufficient to undergo the scaling operation. If the expected benefit is greater than the benefit threshold, the system can perform the scaling operation.

20 Claims, 6 Drawing Sheets

(56) References Cited

U.S. PATENT DOCUMENTS

| | | |
|---|---|---|
| 2018/0101214 A1 | 4/2018 | Mahindru |
| 2019/0179659 A1 | 6/2019 | Herbert |
| 2020/0319935 A1 | 10/2020 | Srivastava |
| 2021/0256066 A1* | 8/2021 | Srinivasan ............ G06F 11/328 |

* cited by examiner

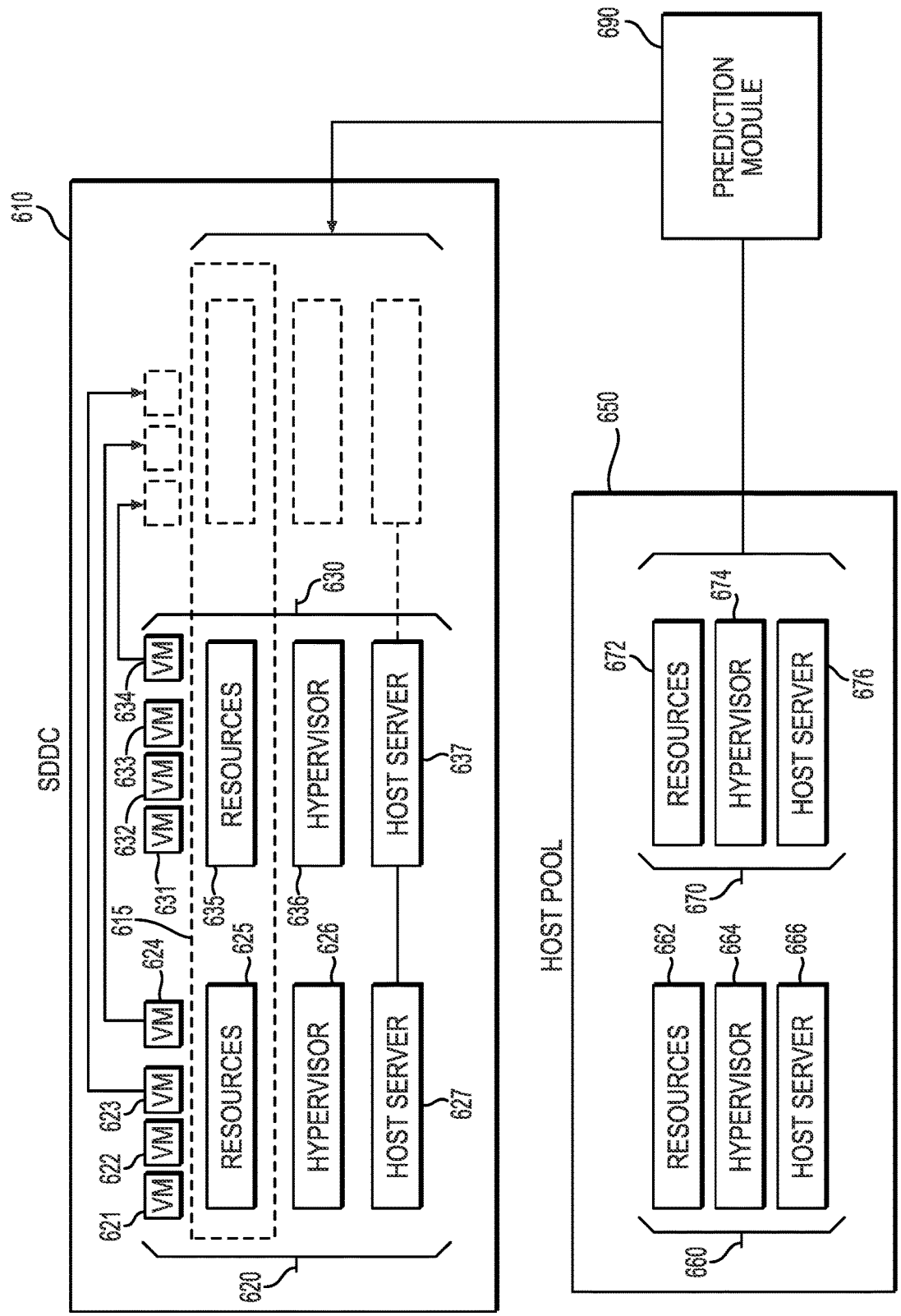

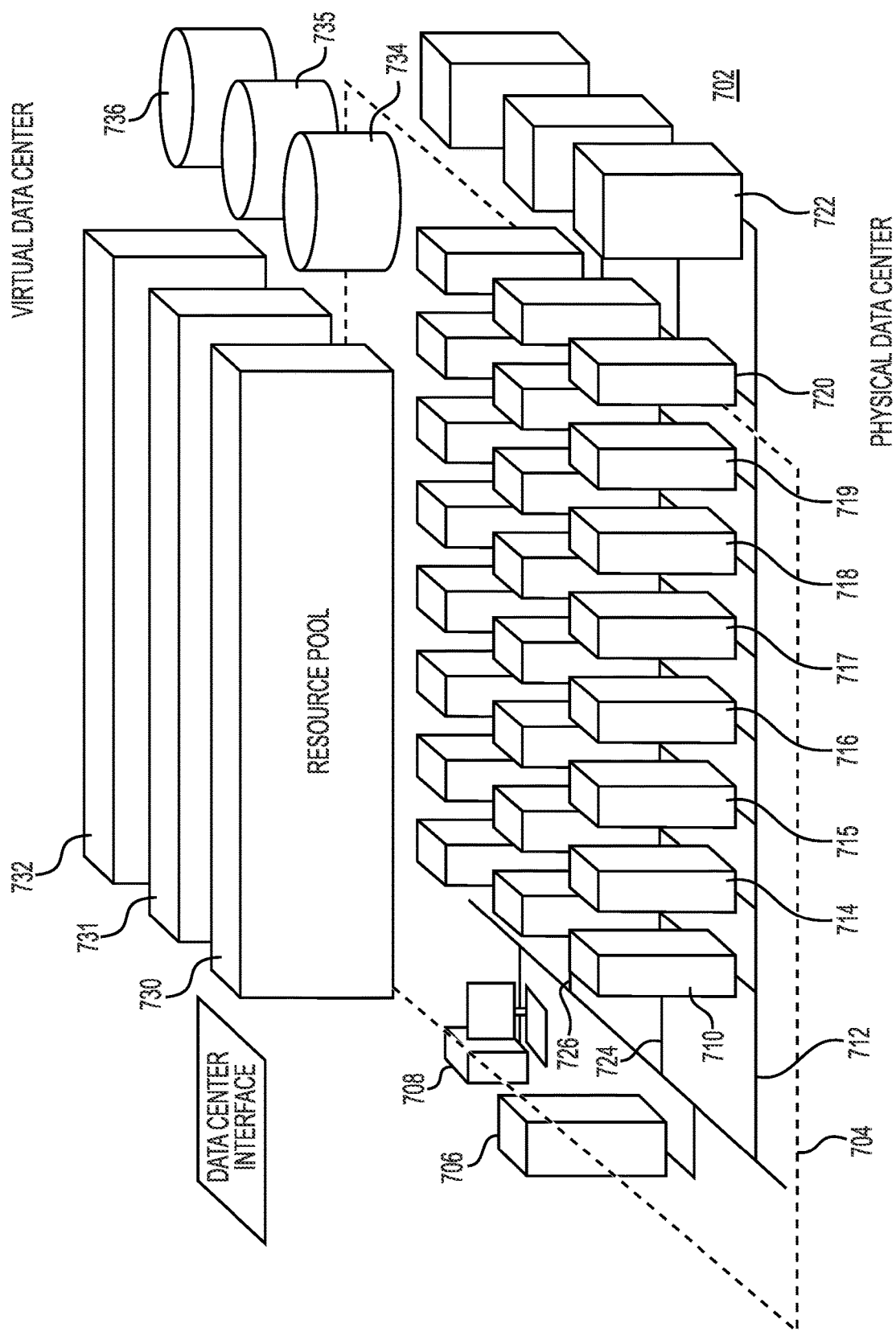

PREDICTIVE SCALING OF DATACENTERS

BACKGROUND

In a software-defined data center ("SDDC"), infrastructure elements are virtualized and delivered as a service. Networking, storage, processing, and security functions can execute as virtualized components on top of physical hardware devices, such as servers. An SDDC can span one or more clouds. By virtualizing aspects of a regular data center, an SDDC can allow for easier and more flexible deployments that scale according to company or customer needs.

SDDCs can be scaled up to meet demand and scaled down to avoid wasting resources. Scaling can include adding or removing components that provide virtualized resources. For example, if a particular virtual machine ("VM") is overloaded, a new VM can be instantiated to share some of that workload. Similarly, if a server running virtualization software (referred to herein as a "host") is overloaded, a new host can be added to the SDDC and VMs can be migrated to the new host to spread the workload around. In the same way, when a VM or a host is no longer needed to maintain adequate workload levels, the VM or host can be removed from the SDDC. In the case of a VM, removal can include removing data from the VM and terminating the VM instance. In the case of host removal, any VMs executing on the host can be migrated to another host, relevant data can be saved or removed, and the host can then be removed from the SDDC, such as by placing it into a host pool that can be available to multiple SDDCs.

The decision to add or remove a host is typically performed reactively. That is, the system monitors resource usage until it determines that resource demand is above or below a relevant threshold for scaling the SDDC up or down, respectively. This process does not always provide optimized scaling recommendations. As an example, the typical process for recommending a scaling operation can lag behind actual demand. This can be caused by the typical process relying on a moving average—because current resource demand is averaged over a historical timeframe, even a large spike in demand can take time to raise the average enough to instigate a scale out. In the meantime, customers can suffer from poor performance.

As another example, the typical process does not perform a cost-benefit analysis on the scaling operation. In this scenario, one such cost is the time it takes to add or remove a host. Removing a host might take an hour to complete, for example. If the SDDC begins an hour-long host-removal process and resource demand rises 30 minutes later, the customer will suffer from poor performance until the host is added back again.

Moreover, the typical process does not account for all relevant performance parameters. With respect to storage resources, for example, a typical process will consider storage space utilization but not input/output ("IO") resources. In some situations, such as where a host or cluster is used for transactional purposes, the resource utilization may be low while the IO load is high. A traditional scaling process may scale down such a cluster based on the low resource utilization, but in doing so would exacerbate the IO load and thereby lower overall performance.

As a result, a need exists for predictive scaling of SDDCs that performs cost-benefit analyses and can account for IO utilization.

SUMMARY

Examples described herein include systems and methods for efficiently scaling an SDDC. An example method can include storing resource utilization information for a variety of resources of the SDDC. The resources can include, for example, central processing unit ("CPU") usage, memory, storage, and IO. CPU resources can reflect the CPU computing power in a cluster or a host, based on the physical CPUs present in the server underlying each host. Memory resources can reflect the random access memory ("RAM") in a cluster or host, based on the physical RAM present in the server underlying each host. Storage resources can reflect the storage space in a virtual storage area network ("vSAN") that aggregates and spans the storage areas of various hosts. IO resources can reflect the IO utilization and bandwidth of a vSAN. Storing resource utilization can include storing an indication of used or unused resources at a point in time for one or more of the resources described above. The indication can be stored within the vSAN or within a storage area outside the SDDC.

The example method can also include predicting a future resource utilization rate for each of the resources. The prediction can be performed by processing at least some of the stored resource utilization information. For example, a machine-learning model can be employed to process the information and identify trends and patterns, such as usage peaks at the beginning of the workday and usage drops at the end of a workday. The example method can include determining that a predicted resource utilization rate of at least one resource is outside a desired range. This can include dropping below a threshold, potentially indicating an overabundance of available resources, or rising above a threshold, potentially indicating a lack of sufficient resources. In some examples, this determination can include determining that multiple of the resource types are outside the desired range.

The example method can also include determining a first time period required for scaling the SDDC. The scaling can include adding or removing a VM or adding or removing a host. Adding or removing a host can include transitioning a host between the SDDC and a host pool. It can also include reallocating data and VMs among hosts to accommodate the additional or removal. The system can utilize historical data to determine an expected time for performing the scaling, based on similar scaling actions involving similar components in the past. For example, the system can calculate an average amount of time for adding a particular type of host to an SDDC in order to make the determination.

The first time period can include several time periods corresponding to multiple steps required for scaling the SDDC. For example, it can include a time period for adding a new host to the SDDC and another time period for load balancing the SDDC based on the new host (by migrating VMs among the hosts, for example). In another example, the first time period can include a time period for evacuating VMs from a host that will be removed from the SDDC and another time period for moving data from that host to a different host.

The example method can further include predicting a second time period that begins after the first time period and extends until the scaling is no longer necessary. As an example, the system can predict a two-hour period of heavy resource usage at the beginning of a workday, after which the workload will return to a lower level. The system can determine that an additional host is necessary during this heavy-usage period in order to maintain acceptable performance levels. In this example, the system also predicts that it will take one hour to scale out the SDDC by adding the host. The remaining time during the two-hour, heavy-usage period would be determined to be one hour. In that example, the second time period corresponds to that one hour that extends after scaling completes until the scaling is no longer necessary.

Having predicted the second time period, the example method can include comparing that time period to a benefit threshold. If the second time period is greater than the benefit threshold, the system can perform the scaling operation. The benefit threshold can be implemented to ensure that the scaling operation provides a tangible benefit for the SDDC. For example, if the resource utilization spikes but is predicted to return to lower levels within 45 minutes, and it would take approximately one hour to add a new host to the SDDC, then the second time period would be zero. That would indicate that a customer would likely not receive any benefit to scaling the SDDC in that manner. If the expected benefit is greater than the benefit threshold, the system can perform the scaling operation.

The benefit threshold can be set by the customer. For example, a customer might not want to employ additional SDDC resources for a benefit expected to last less than 10 minutes, or any other period of time the customer determines to be appropriate. The customer can therefore optimize its SDDC to reduce costs at the expense of performance, ensure performance despite additional costs, or achieve a balance between the two.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 6 is an illustration of an example system for efficiently scaling an SDDC.

FIG. 7 is an illustration of an example virtual datacenter for performing the various methods described herein.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for efficiently scaling an SDDC. An example method can include storing resource utilization information for a variety of resources of the SDDC. The example method can also include predicting a future resource utilization rate for the resources and determining that a predicted utilization rate is outside of a desired range. The system can determine how long it would take to perform the scaling, including adding or removing a host and performing related functions such as load balancing or data transfers. The system can also determine how long the scaling is predicted to benefit the SDDC to ensure that the benefit is sufficient to undergo the scaling operation. If the expected benefit is greater than the benefit threshold, the system can perform the scaling operation.

Figure 1:
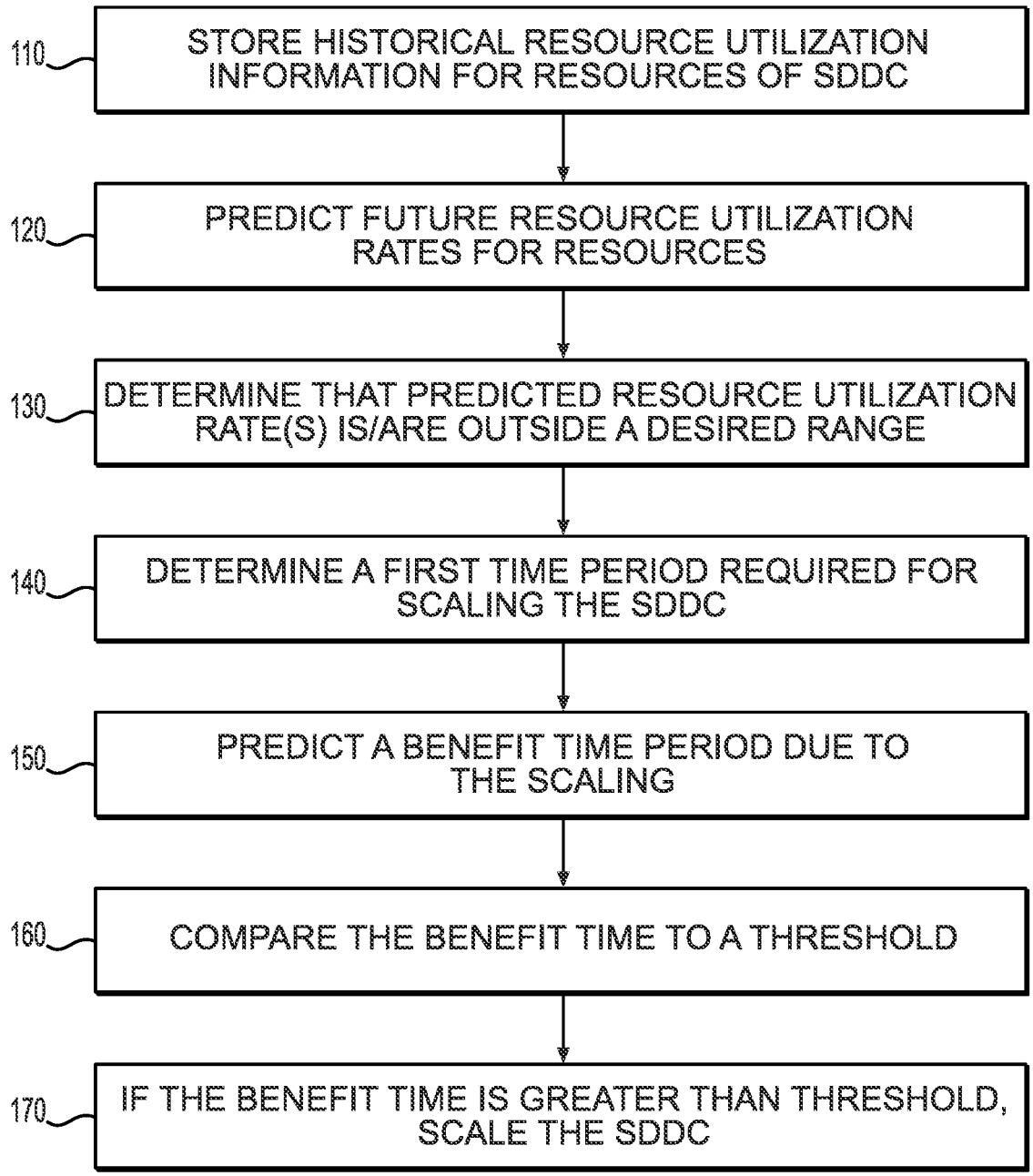
FIG. 1 is a flowchart of an example method for efficiently scaling an SDDC.

FIG. 1 is a flowchart of an example method for efficiently scaling an SDDC. Stage 110 can include storing resource utilization information for resources of the SDDC. The resources can include, for example, CPU utilization, memory utilization, storage utilization, and IO utilization. CPU utilization can be an indication of the CPU computing power being utilized in a cluster or host at a given time. Memory utilization can be an indication of the RAM memory being utilized in a cluster or host at a given time. Storage utilization can be an indication of the vSAN utilization in a cluster or host at a given time. And finally, IO utilization can be an indication of the IO rate associated with the vSAN at a given time.

Stage 110 can include monitoring and gathering resource utilization information through a software management platform for the SDDC, such as VMWARE's VSPHERE. The utilization information can be gathered at time intervals, such as every few seconds or every few minutes. Different resources can be gathered at different rates, in some examples. For example, CPU utilization can fluctuate quickly and therefore can benefit from shorter sampling intervals, whereas vSAN utilization can move slower, allowing for longer sampling intervals. The utilization information can be stored by the management platform in the vSAN of the SDDC, or in a remote storage area outside of the SDDC if desired.

Stage 120 can include predicting future resource utilization for one or more of the resources stored at stage 110. The prediction of stage 120 can be performed by a prediction module that can be located inside or outside of the SDDC. In some examples, the prediction module is an Elastic Distribution Resource Scheduler ("EDRS") that can access the storage area housing the resource utilization information. The term EDRS is used throughout to refer to the prediction module.

The EDRS can perform predictive analysis using the resource utilization information. For example, it can employ a time series forecasting engine backed by one or more machine-learning models. The machine-learning models can be trained using historical resource utilization information for the SDDC at issue. This can allow the models to conform to the particularities of a specific SDDC. For example, one customer using a first SDDC can perform most of its resource utilization during business hours in the Eastern Time Zone of the U.S., while another customer using a SDDC can perform most of its resource utilization during business hours in India. The models for these two different SDDCs can therefore be different from one another and customized to the SDDC at issue.

The EDRS can identify trends and patterns based on historical usage. By way of example, the EDRS can identify that an SDDC experiences high CPU and memory usage when users log in on a weekday morning, dropping around lunch time and then rising in the early afternoon before dropping off sharply after work hours. In another example, the EDRS can identify high IO utilization when a backup is performed every night at a certain time. These trends can be used to predict future resource usage. In addition to general trends such as the ones identified herein, the EDRS can use machine learning to make more comprehensive predictions. The predictions can be provided for multiple time periods into the future, such as minutes, hours, days, or weeks ahead.

At stage 130, the EDRS can compare the predicted resource usage to one or more thresholds to determine whether the usage is within a desired range. For example, cluster CPU capacity can have a low threshold of 50% utilization and a high threshold of 90%. If the predicted CPU utilization is below 50%, that could indicate a need to scale down the SDDC by removing a host. On the other hand, if the predicted CPU utilization is above 90%, that could indicate a need to scale out the SDDC by adding a host. The thresholds can be set by default, by a service provider that operates the SDDC, or by a customer that uses the SDDC.

Stage 130 can also include determining whether the predicted resource usage is outside the desired range for multiple of the resource types. For example, an administrator can establish a rule that scaling down will not be recommended unless more than one resource type is below the desired range. In one example, all resource types must be below their respective desired ranges in order for the EDRS to potentially recommend a scale down. In another example, only one resource type must be above the desired range in order for the EDRS to potentially recommend a scale out.

In addition to providing predictions, EDRS can indicate a confidence level for each prediction. The confidence level can be compared against a different threshold to ensure that only high-confidence predictions are used for making scaling decisions at the SDDC. The confidence threshold can be set by default or by an administrator with knowledge of the prediction functionality.

Stage 140 can include determining a first time period required for scaling the SDDC. The first time period can represent the time required for adding or removing a host, as well as performing any ancillary functions required to adjust for that addition or removal of the host. For example, when the first time period applies to scaling out the SDDC by adding a new host, the first time period can include the time it takes to add the host as well as the time required for load balancing after the new host is online. The EDRS can estimate these times based on historical data regarding adding similar types of hosts, as well as determining the steps required for load balancing and how long those steps will take. For example, the EDRS can determine that a particular type of host will take 20 minutes to add to the SDDC, and that load balancing will require five VMs to be migrated over approximately 10 minutes. The first time period in that example would be 30 minutes.

As another example, when the first time period applies to scaling in the SDDC by removing a host, the first time period can include the time it takes to evacuate VMs from the host as well as the vSAN data evacuation time. The VM evacuation time can utilize an average time for migrating VMs within the SDDC. In some examples, the EDRS can build in a factor of safety by multiplying this time by two, to ensure that the time estimate is sufficient. vSAN data evacuation time can account for the amount of data stored on the host and the time it would take it move it to one or more new hosts, based on available bandwidth and IO rates. For example, the EDRS can determine that evacuating VMs from a host will take 35 minutes, while the vSAN data evacuation will take 15 minutes. The prediction for the first time period in that example would be 50 minutes.

At stage 150, the EDRS can predict a benefit time period that is expected to result from the scaling procedure. Generally speaking, the predicted benefit time can reflect a time period in which the scaling procedure is completed and is still necessary to maintain a resource utilization rate within the desired range. As an example, the EDRS can predict at stages 120 and 130 that the memory utilization of the SDDC is expected to be above an 80% threshold for approximately three hours, after which it is expected to drop below that threshold. At stage 140, the EDRS can predict that scaling the SDDC by adding a new host will take approximately one hour. In that example, the benefit time of the scaling is predicted to be approximately two hours. This is calculated by subtracting the scaling time from the time that the resource is expected to be outside the desired range (i.e. three hours minus one hour in this example).

In some examples, the benefit time can be zero or even negative. In one example, the EDRS predicts that I/O utilization will rise above a 75% threshold for 20 minutes. It can also predict that scaling the SDDC by adding a new host will take approximately one hour. In that example, the benefit time is negative 40 minutes. A negative result indicates that by the time the SDDC has finished scaling up or down, the purpose of the scaling is no longer applicable. In those examples, a scaling process would likely be immediately reversed as soon as it completed. This reversal would waste resources.

At stage 160, the EDRS can compare the benefit time to a benefit threshold. The benefit threshold can be implemented to ensure that any scaling procedure is worth the cost. In one example, the benefit threshold is set to zero. In that example, any positive benefit time would exceed the threshold and scaling would be performed. To spell this out further, in an example the scaling is expected to take one hour while the resource utilization is expected to be outside the desired range for one hour and ten minutes. The benefit time would therefore be ten minutes. If the benefit threshold were set at zero, the EDRS would decide to scale the SDDC at stage 170 because the ten-minute value is greater than zero.

The benefit threshold can be customized to address various concerns. While the EDRS can make use of default benefit thresholds, those thresholds can be modified by a system administrator or directly by a customer of the SDDC. These modifications can be tailored to different goals for the SDDC, as well as being tailored different for scaling up versus scaling down. If a customer has a goal of maximum performance, for example, the benefit threshold for scaling up can be minimal such that higher performance is ensured, even for short periods of time. In that example, the benefit threshold can be set to zero or to a small number such as five or ten minutes. This setting would cause the SDDC to scale out whenever it would provide any performance benefit.

Similarly, when addressing scale-down procedures for an SDDC that is dedicated to maximum performance, the benefit threshold for scaling down can be set to a larger number. This would ensure that the SDDC is not scaled down unless resources will not be needed for a more substantial amount of time. As an example, the customer could set the scale-down benefit threshold to three hours. In that case, even if a scale down procedure would provide a benefit time of one or two hours, the system would not scale down. This can help to ensure that system resources are maintained for high performance.

In another example, an SDDC with a stronger cost focus could set a higher benefit threshold for scaling up and a lower benefit threshold for scaling down. This system would be more likely to scale down and less likely to scale out, relative to the performance-oriented system described previously. These settings can allow a customer to customize the SDDC to their particular needs.

While these examples have been described with respect to utilization of a single resource, stage 170 can include considering multiple resources. For example, the system can be configured such that a scale down procedure will not occur unless multiple resources are below their respective desired ranges and have benefit times greater than their respective benefit thresholds. In some examples, a scale down procedure can require each of CPU utilization, memory utilization, storage utilization, and IO utilization to satisfy the conditions for scaling down before the scale down is performed at stage 170. In another example, a scale out procedure can only require that only a single resource satisfy the conditions for scaling up before initiating the scaling. An administrator or customer can customize the rules for determining which and how many resources are considered in a scaling up or scaling down process.

Figure 2:
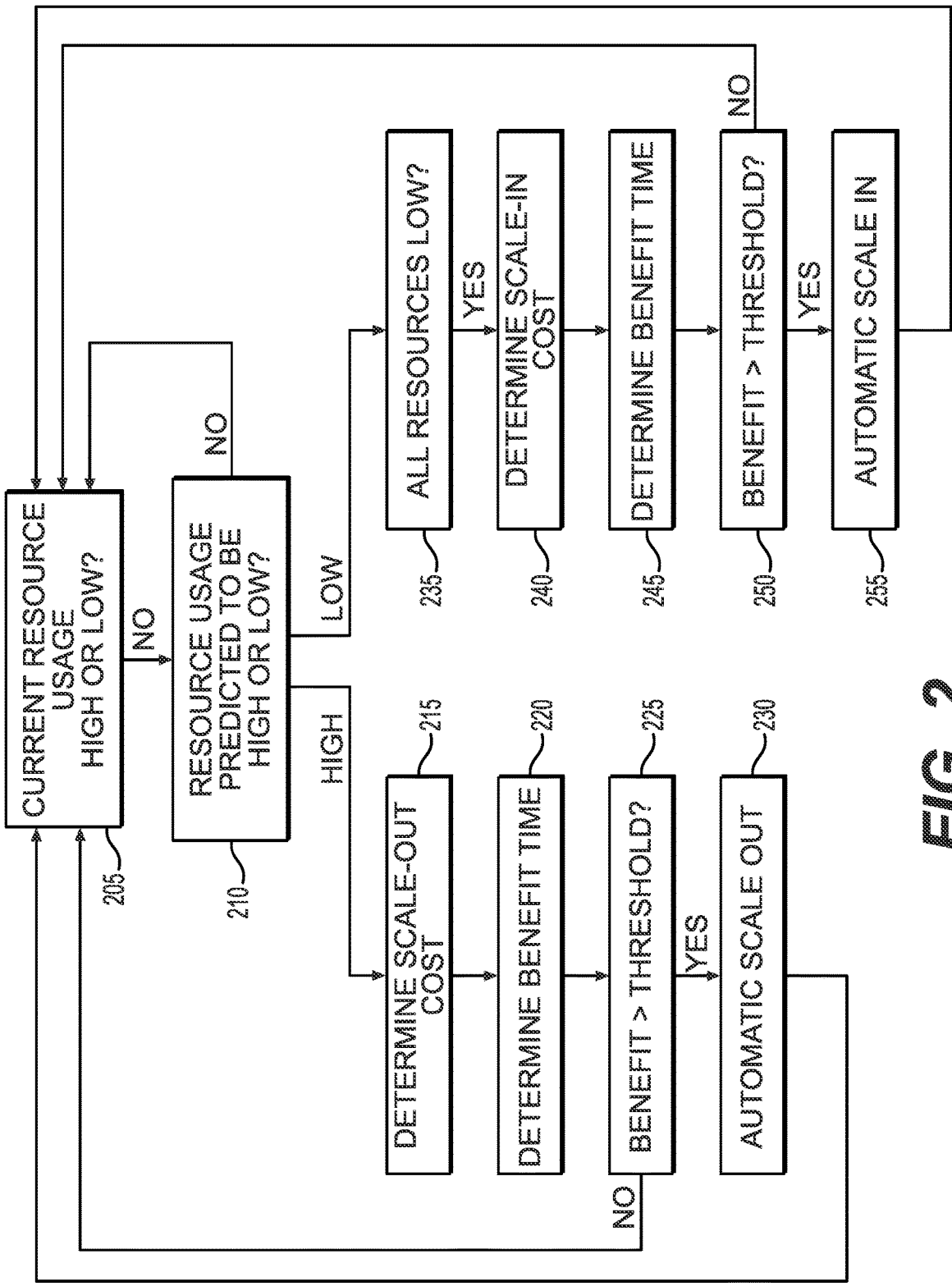
FIG. 2 is a flow diagram of an example method for efficiently scaling an SDDC.

FIG. 2 provides an illustration of a flow for an example method of efficiently scaling an SDDC. At stage 205, the system can determine whether current resource usage is high or low (i.e., outside a desired range) for any of the available resources. If a resource is currently outside of the desired range, the system can apply scaling rules and immediately scale out or in as needed. If the resource utilization is currently within range, the process can continue to stage 210.

At stage 210, the resource utilization can be predicted over a period of time, such as the next few hours or days. If the resource utilization is not predicted to be outside the desired range, the process can return to stage 205. On the other hand, if resource utilization is predicted to be outside the range, then the process can continue based on whether the usage is predicted to be high or low.

In an example where the usage is predicted to be high, the method can proceed to stage 215. At stage 215, the EDRS can determine the scale-out cost required to scale the SDDC to address the predicted usage level. In other words, the EDRS can determine what type of scale out is required to lower the predicted usage below the threshold level, such as by adding one or more hosts or VMs. The EDRS can then determine the time that such scale out would require. For example, the EDRS can estimate the time it takes to add the host as well as the time required for load balancing after the new host is online. The EDRS can access historical data regarding previous host additions (particularly of the same type) within the SDDC to determine the time it will take to add the host. The EDRS can also query a management layer of the SDDC to request information sufficient to determine the time required for load balancing. The information can relate to the number of VMs currently running in the SDDC, the number of VMs the new host can handle, and the migration requirements for balancing loads across VMs by moving one or more to the new host.

At stage 220, the EDRS can determine a benefit time for the scale out procedure. The benefit time can be determined by subtracting the scale-out time from the period of time during which the resource at issue is expected to remain above the threshold. A positive benefit time indicates that the scale out would complete before the resource utilization would be expected to drop back into an acceptable range. A negative benefit time indicates that the scale out would be too slow, as the resource at issue would return to acceptable levels before the new host is online and ready to use.

At stage 225, the EDRS can compare the benefit time to a benefit threshold. The benefit threshold can be set by default, by a system administrator, or by a customer through a user interface in communication with the SDDC. In some examples, a customer can choose a general performance goal for their use of the SDDC, and that performance goal can include an appropriate setting for the benefit threshold. In one example, a customer can choose to run the SDDC (or more specifically, the portion of the SDDC dedicated to that customer) in a performance mode, a cost-savings mode, or a balanced mode. The performance mode can have a lower, or even zero, benefit threshold. This would ensure that if a scale out was predicted to provide any benefit time, it would meet the threshold. The cost-savings mode can set a time, such as one hour, for which the scale out procedure would need to provide a benefit. This would make scale out decisions less likely in general, reserving them for situations where they are really needed. The balanced mode can use a threshold between the performance mode and cost-saving mode thresholds.

If the benefit time is less than the benefit threshold, then the process can return to stage 205. If the benefit time is greater than the benefit threshold, the EDRS can automatically scale out the SDDC appropriately at stage 230. Automatically scaling out can include moving one or more hosts from a host pool to the SDDC and load-balancing the SDDC by migrating one or more VMs from other hosts to the newly added host(s).

Returning to stage 210, in some examples the resource usage is predicted to be below a threshold level. In those examples, the method continues to stage 235. At stage 235 the EDRS determines whether any other resources have predicted usage levels that fall below relevant thresholds during an overlapping time period. For example, if the EDRS determines that memory utilization is below its threshold at stage 210, it can then determine whether any of CPU utilization, storage utilization, or IO utilization are also below their respective thresholds. Any number of these resources can be required to be below their thresholds in order to continue the method. In this example, all four resources must be below their thresholds at stage 235. In that case, the process continues to stage 240.

At stage 240, the EDRS can determine scale-in cost. This can include, for example, determining the time it would take to evacuate VMs from a host to be removed as part of the scale-in process, as well as the vSAN data evacuation time. The VM evacuation time can utilize an average time for migrating VMs within the SDDC. In some examples, the EDRS can build in a factor of safety by multiplying this time by two, to ensure that the time estimate is sufficient. vSAN data evacuation time can account for the amount of data stored on the host and the time it would take it move it to one or more new hosts, based on available bandwidth and IO rates. In examples where multiple resources are required to be below their thresholds at stage 235, the scale-in cost can account for scale-in procedures that would place all of those resources above their respective minimum thresholds.

At stage 245, the EDRS can determine a benefit time. The EDRS can determine the benefit time by subtracting the scale-in time from the period of time during which the resource at issue is expected to remain below its threshold. In examples where multiple resources are implicated, stage 245 can include calculating a benefit time for each of those resources.

At stage 250, the benefit time determined at stage 245 can be compared to a benefit threshold. The benefit threshold can be different for each resource. For example, CPU utilization can have a benefit threshold of 30 minutes, storage utilization can have a benefit threshold of 5 hours, memory utilization can have a benefit threshold of one hour, and IO utilization can have a benefit threshold of 45 minutes. In that example, stage 250 can include comparing the benefit time determined for each resource at stage 245 to the respective benefit threshold for that resource. The system can be configured to require one or more of the resources to have a benefit time greater than the respective benefit threshold. In an example where stage 235 required each of the four resources to be below their utilization thresholds, stage 250 can require those four resources to have benefit times greater than their respective benefit thresholds.

In an example where the benefit time exceeds the benefit threshold for the required number of resources, the method can continue to stage 255. At that stage, the EDRS can recommend an automatic scaling in of the SDDC, such as by removing the data and VMs from a host and then removing that host from the SDDC. The removed host can be migrated to a host pool for later use.

Figure 3:
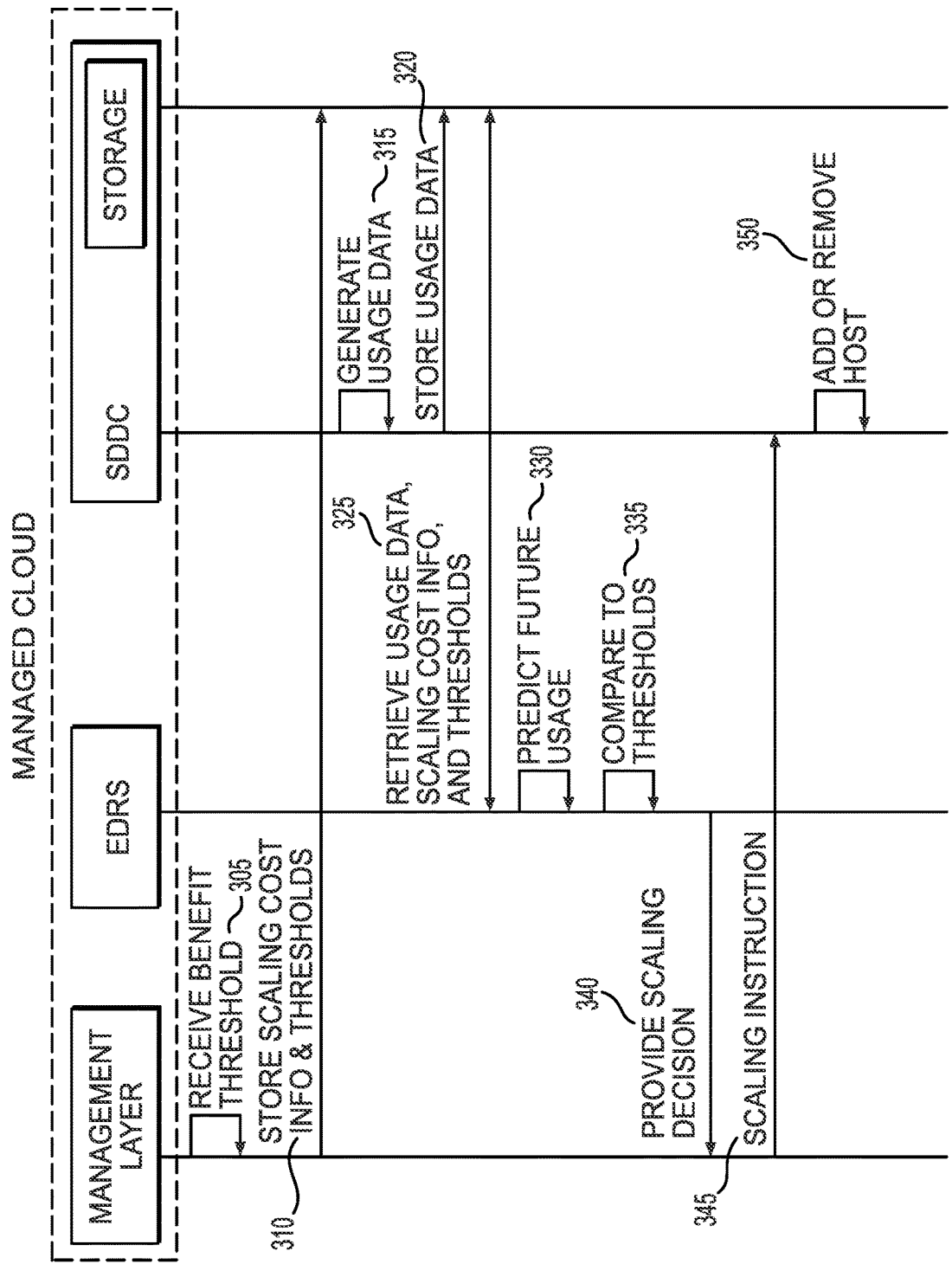
FIG. 3 is a sequence diagram of an example method for efficiently scaling an SDDC.

FIG. 3 provides a sequence diagram of an example method for efficiently scaling an SDDC. The sequence diagram depicts a managed cloud that includes a management layer, EDRS, SDDC, and SDDC storage. Although the SDDC and its storage are shown to be distinct from the management layer and EDRS, these various components can all reside within the SDDC in some examples. In other examples, the management layer and EDRS are located remotely from the SDDC and utilize computing resources from elsewhere.

At stage 305, the management layer can receive a benefit threshold input. This can be performed by loading a default threshold in some examples, or it can include receiving user input that sets the benefit threshold. For example, a customer or administrator can enter information through a user interface that is in communication with the SDDC. The user interface can be provided as part of a standalone software package or can be provided through a web application, in some examples. The user can enter or select a time for a benefit threshold, such as by entering a number of minutes (or hours, days, etc.) or by selecting from different options with set amounts of time (such as options for 15 minutes, 30 minutes, 45 minutes, and so on). In some examples, the user can select an option that allows for different resources to apply different benefit thresholds. This can allow a user to tailor the operation of the SDDC to particular needs of an organization.

In some examples, rather than requiring input from the user about each benefit threshold for each resource, the user interface can provide more general options for a user to select. For example, the system can allow the user to select between performance, cost, or balanced approaches. If a customer has a goal of maximum performance, for example, the benefit threshold for scaling up can be minimal such that higher performance is ensured, even for short periods of time. In that example, the benefit threshold can be set to zero or to a small number such as five or ten minutes. This setting would cause the SDDC to scale out whenever it would provide any performance benefit.

Similarly, when addressing scale-down procedures for an SDDC that is dedicated to maximum performance, the benefit threshold for scaling down can be set to a larger number. This would ensure that the SDDC is not scaled down unless resources will not be needed for a more substantial amount of time. As an example, the customer could set the scale-down benefit threshold to three hours. In that case, even if a scale down procedure would provide a benefit time of one or two hours, the system would not scale down. This can help to ensure that system resources are maintained for high performance.

In another example, an SDDC with a stronger cost focus could set a higher benefit threshold for scaling up and a lower benefit threshold for scaling down. This system would be more likely to scale down and less likely to scale out, relative to the performance-oriented system described previously. These settings can allow a customer to customize the SDDC to their particular needs. Additionally, stage 305 can include allowing a customer or administrator to select the number of resources required to have a benefit time above a threshold in order to instigate a scaling procedure.

At stage 310, the management layer can store information relating to scaling at a storage location of the SDDC. This information can include, for example, performance thresholds, benefit thresholds, historical migration times for VMs, historical times for adding a new host, and information relating to any other steps that would be required for adding or removing a host from the SDDC.

Stage 315 can include generating usage data by the SDDC. In some examples, this stage is performed by the management layer or the EDRS. This stage can include gathering usage metrics from the SDDC, such as information regarding the number of active hosts and VMs and their respective specifications; the amount of data stored at each host; the workloads of each host and VM; and the CPU utilization, memory utilization, storage utilization, and IO utilization for each host and for the cluster as a whole. This information can be timestamped and saved as a time series at certain time intervals, such as every 30 seconds. The information can be stored within a storage location at stage 320. The storage location can be a partition, table, or other file stored within the vSAN of the SDDC.

At stage 325, the EDRS can retrieve usage data, scaling cost info, and thresholds from the storage location. In some examples, this information is saved in one or more tables or profiles. For example, usage data can be stored in an XML file with columns corresponding to different resource types and row corresponding to sampling times (or vice versa). The corresponding cells can include a raw number representing a usage amount, or alternatively a percentage representing the proportion of the relevant resource being utilized at that time. In some examples, multiple columns or rows can be used to include both the raw data and the proportional utilization numbers.

Stage 325 can also include retrieving a profile with relevant information stored within it. For example, a profile can include scaling cost information such as the historical or average times for adding or removing particular types of hosts. While FIG. 3 shows the EDRS retrieving this information from the storage location directly, in some examples the EDRS can query the management layer to request some or all of this information.

At stage 330, the EDRS can predict future usage for one or more resources of the SDDC. For example, it can employ a time series forecasting engine backed by one or more machine-learning models. An example forecasting engine is Captain Crunch, an online time series forecasting engine developed by VMWARE. The forecasting engine (also referred to as a machine-learning model through this disclosure) can provide real-time forecasts with configurable confidence levels. It can also provide diverse model options such as trend, stochastic, and periodicity. Various inputs can be used to train and, after training, to utilize the forecasting engine. For example, inputs can include the number of sessions currently using a VM, number of sessions currently using a host, throughput measurement of a host, storage availability at a host, CPU utilization for a host, number of VMs executing on a host, number of sessions using the SDDC, session time from start to finish, time of day, and day of the week. These inputs can be analyzed by one or more machine-learning algorithms to predict future values for any of the inputs provided to the system.

The machine-learning models can be trained using historical resource utilization information for the SDDC at issue, such as the information retrieved at stage 325. This can allow the models to conform to the particularities of a specific SDDC. For example, one customer using a first SDDC can perform most of its resource utilization during business hours in the Eastern Time Zone of the U.S., while another customer using a SDDC can perform most of its resource utilization during business hours in India. The models for these two different SDDCs can therefore be different from one another and customized to the SDDC at issue.

The EDRS can identify trends and patterns based on historical usage. By way of example, the EDRS can identify that an SDDC experiences high CPU and memory usage when users log in on a weekday morning, dropping around lunch time and then rising in the early afternoon before dropping off sharply after work hours. In another example, the EDRS can identify high IO utilization when a backup is performed every night at a certain time. These trends can be used to predict future resource usage. In addition to general trends such as the ones identified herein, the EDRS can use machine learning to make more comprehensive predictions. The predictions can be provided for multiple time periods into the future, such as minutes, hours, days, or weeks ahead.

At stage 335, the EDRS can compare the predicted resource usage to one or more thresholds obtained at stage 325. In some examples, each resource includes an upper utilization threshold and a lower utilization threshold. Exceeding the upper utilization threshold can indicate that the resource is being utilized too heavily and that performance has dropped off or may drop off soon. On the other hand, resource usage below the lower utilization threshold can indicate an overabundance of a resource and a potential opportunity to save costs by scaling back the allocation for that resource.

Stage 335 can also include determining a predicted benefit time and comparing that to any relevant benefit thresholds. The predicted benefit time can reflect a time period in which the scaling procedure is completed and is still necessary to maintain a resource utilization rate within the desired range. The benefit threshold can be implemented to ensure that any scaling procedure is worth the cost. The application of benefit times and benefit thresholds is described above with respect to stages 150-170 of FIG. 1 and stages 220, 225, 245, and 255 of FIG. 2.

At stage 340, the EDRS can provide a scaling recommendation to the management layer. In some examples, the scaling recommendation is generic in nature to allow for the management layer to make any further decisions required to perform the scaling. For example, in an instance where the EDRS determines that CPU utilization is high enough to warrant a scale out, the EDRS can provide a recommendation to the management layer to increase CPU resources in the SDDC. In another example, the scaling recommendation provides more detail, such as by recommending that the management layer migrate a particular type of host from a host pool to the SDDC and recommending a certain number of VMs be migrated to the new host.

The management layer can provide the scaling instruction to the SDDC at stage 345. In some examples, the management layer requires an administrator to sign off on the addition or removal of a host from the SDDC, and upon receiving approval, provides the instruction at stage 345. In other examples, the management layer automatically provides the scaling instruction without intervention from any human user. The scaling instruction can be carried out at the SDDC at stage 350, where one or more hosts are added or removed from the SDDC, increasing or decreasing the available resources accordingly.

An example pseudocode for determining whether a scale out would be beneficial is provided below.

```
If (scale_out_proposed)
    // P_UTIL returns all predictive utilization samples from now to
    specified
    // future time.
    benefit_value = AVG(P_UTIL(scale_out_done_time))
    If (benefit_value > low_threshold)
    Return beneficial
```

The pseudocode above describes a process for determining, when a scale out is proposed, whether the scale out would be beneficial. The benefit value is defined as an average of various P_UTIL values. P_UTIL is predictive utilization of a resource at a particular sampling time. The sampling is performed after the scale out is complete, such as after a host has been added to the SDDC. The average of these predictive utilizations provides a benefit value, which can then be compared to a benefit threshold. If the benefit value is greater than the benefit threshold, then the proposed scale out is beneficial in this example.

Another example pseudocode is provided below with additional details.

```
tick = 3 * 60 // Set the internal tick time as 3 minutes
    MetricProcessor(tick);
    While (in_stream not end)
    ...
    curr_utililization = get_next(in_stream)
    MetricProcessor.load(curr_utilization)
    // Return high confidence forecast only
    ForecastIter = MetricProcessor.forcast(HI_CONF)
    ForecastIter.next( ) // Drop the 1st forecast
    // Start forecasting from 6 minutes in the future
    predicted_utilization = ForecastIter.next( )
    benefit_sum = predicted_utilization
    cost_sample_count = cost_time / tick
    Repeat(cost_sample_count − 1)
    benefit_sum += ForecastIter.next( )
    benefit_value = benefit_sum / cost_sample_count
```

The pseudocode above describes a process for determining a benefit value of a scaling procedure. The code includes a machine-learning model, called MetricProcess here, which provides predicted resource utilization rates at different times based on the chosen tick time. The code also includes steps for returning only high-confidence predictions by dropping the first forecast and using only the high-confidence predictions starting afterwards.

The code then sums predictions and the costs, then divides them to get an average benefit value over a given period of time. This allows for higher confidence predictions that apply to a range of times, rather than a single point in time.

Figure 4:
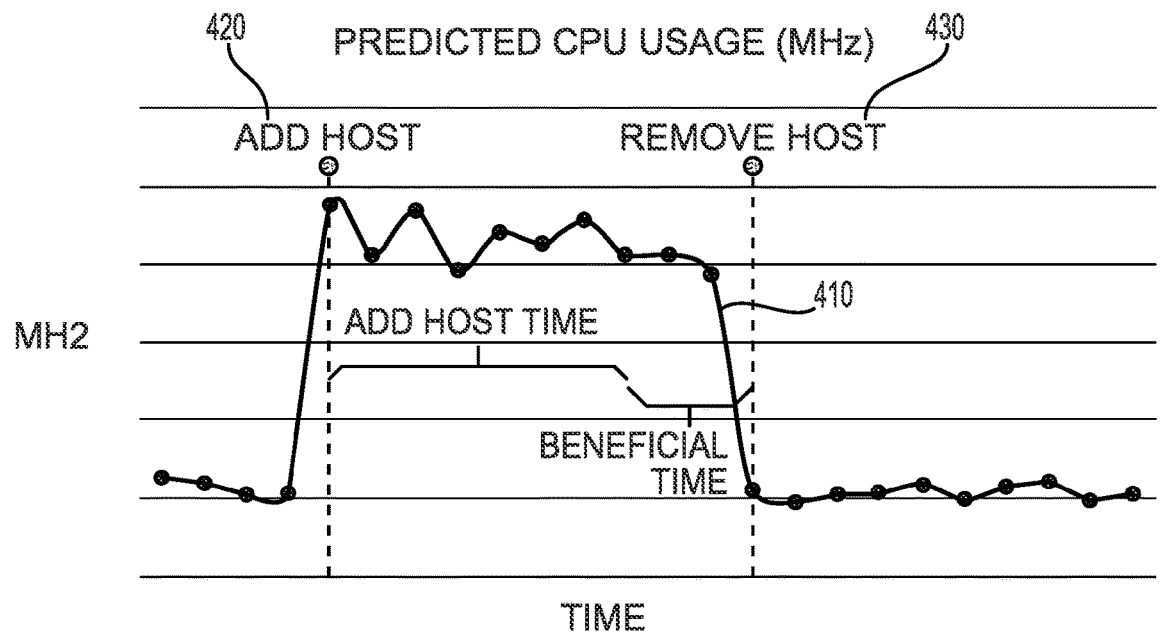
FIG. 4 is a graph showing predicted resource usage and scaling considerations.

FIG. 4 provides a graph showing predicted resource usage and scaling considerations. The graph depicts time along the x-axis and CPU usage in MHz along the y-axis. A time series 410 shows the predicted CPU usage at various points in time. The graph shows a hypothetical event 420 where a new host is added to the SDDC to handle the predicted rise in CPU usage. The graph also shows a hypothetical event 430 where the host is removed from the SDDC based on the lower predicted usage at that time.

The graph of FIG. 4 also shows an "add host time" that spans a portion of the x-axis. This timespan represents the time required to add a new host and perform any ancillary functions, such as load balancing the SDDC based on the new host and any new VMs. The add host time begins at event 420, representing the point in time at which the host would be added in this example. The remaining time period between the add host time and the remove host event 430 is labeled as "beneficial time," representing the duration of time for which the SDDC makes use of the additional CPU resources provided by the host. The beneficial time elapses when the host can be removed at the remove host event 430. This beneficial time period can be compared to a threshold to determine whether the scaling procedure is worthwhile. If the beneficial time period is too small or even nonexistent, then the system can decide not to perform the scaling operation.

Figure 5:
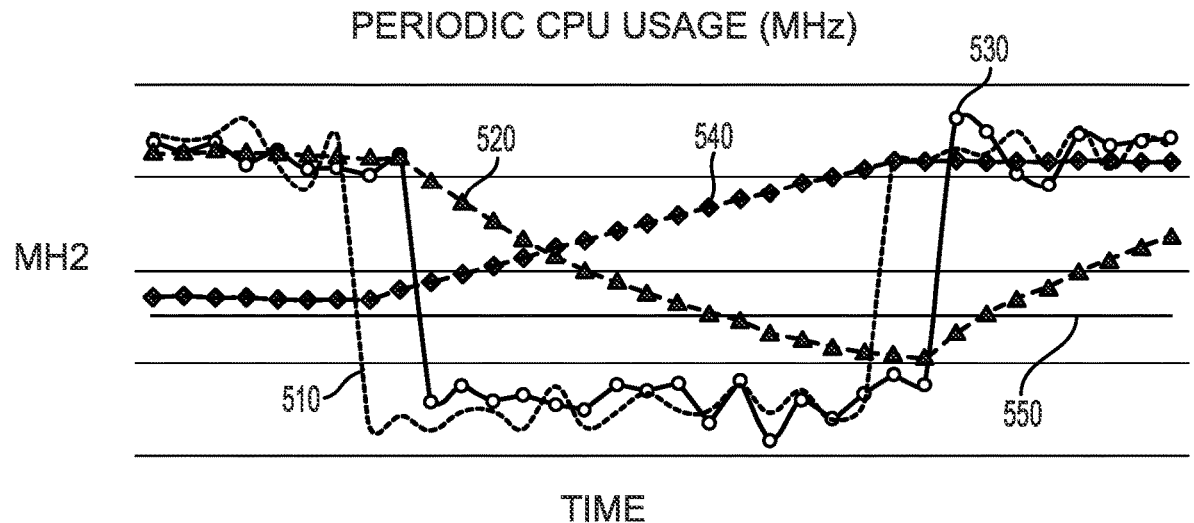
FIG. 5 is a graph showing predicted and actual resource usages and related considerations.

FIG. 5 provides a graph relating to CPU usage with time on the x-axis and CPU usage in MHz on the y-axis. The graph includes a predicted resource usage 510, a resource usage moving average 520, a real-time resource usage 530, a benefit value 540, and a threshold 550. The graph of FIG. 5 is intended to illustrate a sudden drop in CPU utilization, such as what may occur during a lunch hour. As shown, the predicted usage 510 precedes the actual resource usage 530 with respect to both the drop and the subsequent rise after lunch. Based on the drop, the moving average 520 gradually lowers until the actual usage 530 rises again and causes the moving average 520 to gradually rise.

This example assumes that it would take 90 minutes to remove a host from the SDDC. The drop due to the lunch hour may only last approximately an hour, meaning that the procedure would not have time to complete unless it began in advance. In this example, the host removal process is completed at around the time where the predicted usage 510 drops. As a result, the benefit value 540 begins to rise around this time and continues rising until the predicted usage 510 rises above the threshold 550. This figure therefore illustrates a validation of the cost-benefit model implemented by the EDRS.

FIG. 6 an illustration of a system for carrying out the various methods described herein. The system includes an SDDC 610, a host pool 650, and a prediction module 690. In some examples, the host pool 650 and prediction module 690 can be configured to be part of the SDDC, but in this example they are separate. The SDDC 610, host pool 650, and prediction module 690 can be maintained by a service provider and made available to one or more customers. Collectively, these components can be considered a managed cloud, or at least a portion of a managed cloud.

The SDDC 610 can include various hosts 620, 630. As shown, host 620 can include a host server 627 that houses physical computing components such as CPUs, RAM memory chips, storage drives, and interfaces for accessing those physical components. The host server 627 can run a hypervisor 626, which can include virtualization software and firmware that allows the host server 627 to be leveraged for virtualization purposes. The host 620 includes resources 625 that are underpinned by the physical components of the host server 627 and made available by the hypervisor 626. The resources can include CPU resources, memory resources, storage resources, and IO resources, for example. Host 630 includes similar components, such as a host server 637, hypervisor 636, and resources 635.

Some resources can be distributed across multiple hosts 620, 630. For example, distributed resource 615 is shown as a dashed-line box that encompasses resources 625, 635 from both hosts 620, 630. An example of this type of distributed resource 615 is a vSAN, where the individual storage drives of each host are collectively pooled together to form a virtual storage network accessible by various devices or components. In a distributed network, chunks of data can be stored across multiple physical storage devices but remain easily accessible.

Each host 620, 630 can also include multiple instances of VMs executing on the host 620, 630. For example, FIG. 6 shows that host 620 is running four VMs 621, 622, 623, 624 and host 630 is also running four VMs 631, 632, 633, 634. Customers can utilize these VMs to perform a variety of workflows.

When a host is not being used by the SDDC 610, it can be placed into the host pool 650. By moving hosts between the SDDC 610 and host pool 650, the time required for adding a new host can be minimized by avoiding the need to generate and configure a new host from scratch. Host pool 650 can include any number of hosts, but in the example of FIG. 6 has two hosts 660, 670. As with the hosts in the SDDC 610, these hosts 660, 670 include a host server 666, 676, hypervisor 664, 674, and resources 662, 672. In this example, the hosts 660, 670 in the host pool 650 are not currently running any VMs, as there is no work to be performed at the time.

The system of FIG. 6 also includes a prediction module 690, which can be the EDRS discussed previously. The prediction module 690 can perform the various prediction and recommendation methods described herein, including recommending that a host be added to the SDDC 610. In this example, the prediction module 690 is moving host 670 from the host pool 650 to the SDDC 610, as indicated by the dashed lines in the SDDC 610. As part of this move, several VMs 623, 624, 634 will be moved from their respective hosts 620, 630 to the new host 670. This migration of VMs 623, 624, 634 can be performed for load-balancing purposes, such that each host handles a roughly similar workload. Although not shown in FIG. 6, the prediction module 690 can migrate a host from the SDDC 610 to the host pool 650 as necessary, with VMs being moved from that host to other hosts that will remain in the SDDC 610. In this way, resource allocation can scale out and in without disrupting user workflows.

FIG. 7 provides an illustration of a simplified SDDC that can perform the various methods described herein. Specifically, FIG. 7 illustrates virtual data centers provided as an abstraction of underlying physical-data-center hardware components. In some examples, the virtualized data center is considered an SDDC. A physical data center 702 is shown below a virtual-interface plane 704. The physical data center consists of a virtual-infrastructure management server ("VI-management-server") 706 and any of various different computers, such as PCs 708, on which a virtual-data-center management interface can be displayed to system administrators and other users. The interface can be a software-based control system, such as VMWARE VCLOUD DIRECTOR.

The physical data center additionally includes a number of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple VMs. Different physical data centers can include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of VMs with respect to resource pools, virtual data stores, and virtual networks, so that virtual-data-center administrators need not be concerned with the identities of physical-data-center components used to execute particular VMs. Furthermore, the VI-management-server includes functionality to migrate running VMs from one physical server to another in order to optimally or near optimally manage resource allocation, provide fault tolerance, and high availability. It can migrate VMs to most effectively utilize underlying physical hardware resources, to replace VMs disabled by physical hardware problems and failures, and to ensure that multiple VMs supporting a high-availability virtual appliance are executing on multiple physical computer systems. This ensures the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the resources of individual physical servers and migrating VMs among physical servers to achieve load balancing, fault tolerance, and high availability.

The virtual data center provided by a service provider can be configured through a control system interface displayed on a user device, such as a computer or smartphone. In some examples, both the service provider and the tenants of that service provider can access certain configuration information through a GUI associated with the control system.

The SDDC of FIG. 7 can include multiple SDDC instances executing within the SDDC. For example, the SDDC can include an SDDC manager instance that operates on a standalone SDDC stack within the overall SDDC. Similarly, the SDDC can include an SDDC workflow instance that operates on another SDDC stack. The SDDC can include multiple SDDC manager instances and SDDC workflow instances, as described above.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A system for efficiently scaling a software defined datacenter (SDDC), comprising:
   a memory storage including a non-transitory, computer-readable medium comprising instructions; and
   a computing device including a hardware-based processor that executes the instructions to carry out stages comprising:
      storing resource utilization information for a plurality of resources of the SDDC;
      predicting a future resource utilization rate for each of the plurality of resources;
      determining that the predicted resource utilization rate of at least one of the resources is outside a desired range;
      determining a first time period required for scaling the SDDC such that the predicted resource utilization rate of the at least one resource remains inside the desired range;
      predicting a second time period beginning after the first time period and extending to a time at which the scaling would no longer be necessary to maintain the resource utilization rate of the at least one resource within the desired range;
      comparing the second time period to a benefit threshold; and
      if the second time period is greater than the benefit threshold, scaling the SDDC.

2. The system of claim 1, wherein scaling the SDDC comprises adding or removing a host from the SDDC.

3. The system of claim 1, wherein the plurality of resources of the SDDC includes at least one of a processing resource, a memory resource, a storage resource, and an input-output (I/O) resource.

4. The system of claim 1, wherein determining a first time period required for scaling the SDDC comprises:
   determining a third time period for adding a new host to the SDDC;
   determining a fourth time period for load balancing the SDDC based on the new host; and
   combining the third and fourth time periods.

5. The system of claim 1, wherein determining a first time period required for scaling the SDDC comprises:
   determining a fifth time period for evacuating at least one virtual machine (VM) from a host to be removed from the SDDC;
   determining a sixth time period for moving data on the host to a different host; and
   combining the fifth and sixth time periods.

6. The system of claim 1, wherein the benefit threshold is set by a customer of the SDDC through use of a graphical user interface (GUI).

7. The system of claim 1, wherein predicting the future resource utilization rate for each of the plurality of resources is performed by a machine learning model trained with at least some of the stored resource utilization information.

8. A non-transitory, computer-readable medium containing instructions that, when executed by a hardware-based processor, performs stages for efficiently scaling a software defined datacenter (SDDC), the stages comprising:
   storing resource utilization information for a plurality of resources of the SDDC;
   predicting a future resource utilization rate for each of the plurality of resources;

determining that the predicted resource utilization rate of at least one of the resources is outside a desired range;

determining a first time period required for scaling the SDDC such that the predicted resource utilization rate of the at least one resource remains inside the desired range;

predicting a second time period beginning after the first time period and extending to a time at which the scaling would no longer be necessary to maintain the resource utilization rate of the at least one resource within the desired range;

comparing the second time period to a benefit threshold; and if the second time period is greater than the benefit threshold, scaling the SDDC.

9. The non-transitory, computer-readable medium of claim 8, wherein scaling the SDDC comprises adding or removing a host from the SDDC.

10. The non-transitory, computer-readable medium of claim 8, wherein the plurality of resources of the SDDC includes at least one of a processing resource, a memory resource, a storage resource, and an input-output (I/O) resource.

11. The non-transitory, computer-readable medium of claim 8, wherein determining a first time period required for scaling the SDDC comprises:

determining a third time period for adding a new host to the SDDC;

determining a fourth time period for load balancing the SDDC based on the new host; and combining the third and fourth time periods.

12. The non-transitory, computer-readable medium of claim 8, wherein determining a first time period required for scaling the SDDC comprises:

determining a fifth time period for evacuating at least one virtual machine (VM) from a host to be removed from the SDDC;

determining a sixth time period for moving data on the host to a different host; and combining the fifth and sixth time periods.

13. The non-transitory, computer-readable medium of claim 8, wherein the benefit threshold is set by a customer of the SDDC through use of a graphical user interface (GUI).

14. The non-transitory, computer-readable medium of claim 8, wherein predicting the future resource utilization rate for each of the plurality of resources is performed by a machine learning model trained with at least some of the stored resource utilization information.

15. A method for efficiently scaling a software defined datacenter (SDDC), comprising:

storing resource utilization information for a plurality of resources of the SDDC;

predicting a future resource utilization rate for each of the plurality of resources;

determining that the predicted resource utilization rate of at least one of the resources is outside a desired range;

determining a first time period required for scaling the SDDC such that the predicted resource utilization rate of the at least one resource remains inside the desired range;

predicting a second time period beginning after the first time period and extending to a time at which the scaling would no longer be necessary to maintain the resource utilization rate of the at least one resource within the desired range;

comparing the second time period to a benefit threshold; and if the second time period is greater than the benefit threshold, scaling the SDDC.

16. The method of claim 15, wherein scaling the SDDC comprises adding or removing a host from the SDDC.

17. The method of claim 15, wherein the plurality of resources of the SDDC includes at least one of a processing resource, a memory resource, a storage resource, and an input-output (I/O) resource.

18. The method of claim 15, wherein determining a first time period required for scaling the SDDC comprises:

determining a third time period for adding a new host to the SDDC;

determining a fourth time period for load balancing the SDDC based on the new host; and combining the third and fourth time periods.

19. The method of claim 15, wherein determining a first time period required for scaling the SDDC comprises:

determining a fifth time period for evacuating at least one virtual machine (VM) from a host to be removed from the SDDC;

determining a sixth time period for moving data on the host to a different host; and combining the fifth and sixth time periods.

20. The method of claim 15, wherein the benefit threshold is set by a customer of the SDDC through use of a graphical user interface (GUI).

* * * * *